Aug. 27, 1957  R. FERRY  2,804,517
OIL LEVEL INDICATOR
Filed July 16, 1954
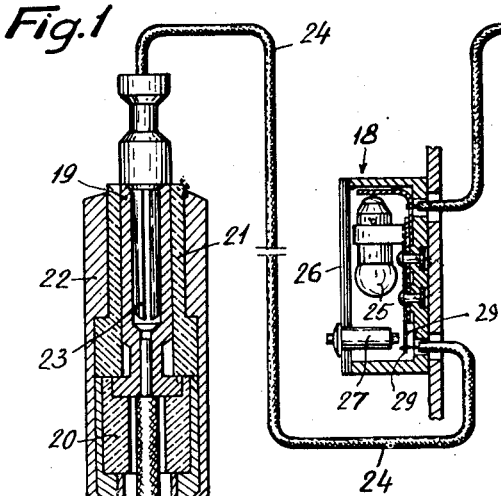
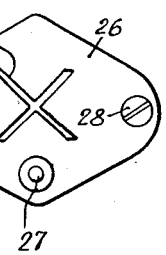
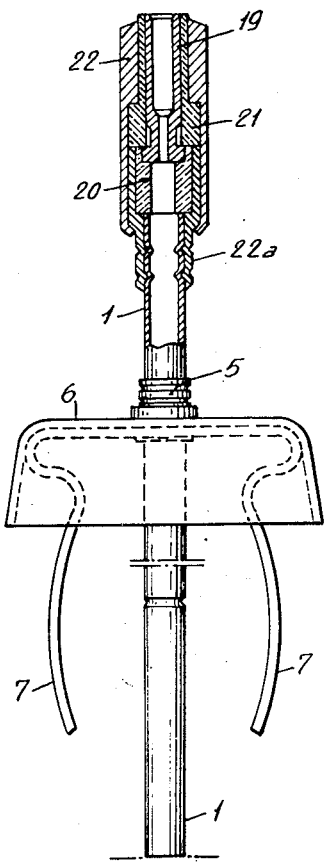
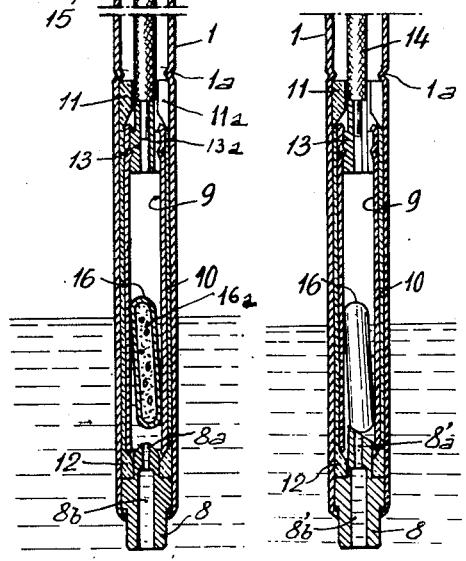
INVENTOR: ROGER FERRY
BY Victor N. Thorst

United States Patent Office 2,804,517
Patented Aug. 27, 1957

2,804,517

OIL LEVEL INDICATOR

Roger Ferry, Neuilly-sur-Seine, France, assignor to Jean Billarant, Paris, France Application July 16, 1954, Serial No. 443,869

Claims priority, application France February 6, 1954

2 Claims. (Cl. 200—84)

The present invention relates to a gage for indicating the level of the oil in an engine casing or the like of the type wherein this gage which takes the place of the conventional gage comprises a tubular member open at its lower end and immersed in the oil of the casing, whereby the oil rises in said tubular member up to the same level as in the casing, a portion of the lower wall of said tubular member electrically insulated from the rest of the gage being inserted in the earth or grounded circuit of a pilot lamp and cooperating with an inner float in the gage in order to complete said circuit when said float assumes a particular position corresponding to the critical level of the oil in the casing.

The object of the invention is to provide an embodiment of the invention which is simple to manufacture though sturdy and having small overall dimensions for the gage.

Another object of the invention is to provide a reliable indicating gage regardless of the inclination assumed by the gage in any type of casing, giving consistant indications, regardless of momentary variations either in the speed or in the position of the vehicle, so that the gage may be particularly readily and economically adapted to the various types of casings.

A further object of the invention is to provide an indicating gage the shape of which is similar to the shape of a conventional gage of a vehicle engine and the disposition of which is identical, so that the improved gage may be used as a conventional gage should the indicating circuit temporarily fail to operate.

The above mentioned advantages are derived from the following features of the invention.

The gage is made of tubular components upset together so as to form a body of revolution having a very small cross-section and which, in principle, is the same for a wide range of gage sizes corresponding to various casings. This small cross-section has, among others, the advantage of providing a small inertia of the float contained therein which may have a cross-section of nearly the same size as the cavity where it is contained thus avoiding any damage to the float.

In this embodiment the gage has electrical connection contacts which are ample, stable and tight, namely, from the entrance to the earth or grounded insulated circuit in the gage, a removable external plug and socket contact, a braided wire the ends of which are connected to terminal lugs by means of a squeezing and possibly soldering operation; an upset connection of the terminal lugs to the related sleeves; finally an ample and tight contact between the gage and the corresponding aperture through the casing wall through a resilient sheath having very good conducting properties which is inserted therebetween.

The gage comprises a float of simple construction made by contracting both ends of a portion of a tube having very thin walls and good conducting properties filled with an expansible and compressed material having low capacity to be impregnated with engine oil, preferably a cork rod, said float occupying transversally the major portion of the cavity where it is housed in order to minimize the effects of impact thereagainst and to offer contacts of a wider area with the parts that surround it laterally and at its base.

The aperture through which the gage is in communication with the oil body is designed in the shape of a narrow duct opposing any variation in the gage level which otherwise would follow the variations of the level of the oil in the casing, both levels being subjected to the pressure of the gas within the casing.

Adapting a gage of adequate length to a given casing is readily achieved, on one hand by inserting a resilient metal sleeve fitting the gage body and having a thickness corresponding to the aperture through the casing, said sleeve constituting at the same time an electrical grounded or earth connection for the gage body, and on the other hand by securing to the gage body an abutment flange which, while bearing upon the boss of the gage aperture through the casing, determines the amount the gage penetrates into the casing, the gage being so designed that, in most of the instances, at its intended location in the sleeve its lowermost point is at a distance of about 5 mm. from the bottom of the casing.

Other and further objects and advantages of the invention will be apparent to those skilled in the art, from a consideration of the following description of one specific embodiment of the invention, diagrammatically shown by way of example, in the accompanying drawings, in which:

Fig. 1 is an axial section of the gage together with the indicating circuit to the indicating box, Fig. 2 is a front elevational view of the closing plate of the indicating box carrying a transparent warning signal, Fig. 3 is an axial section of the lower portion of the gage showing the position assumed by the float when the oil reaches its critical level, together with a modification of the tip of the gage, and Fig. 4 shows, with some portions of the gage broken away, a modification of the device for securing the gage to the casing, when the gage is introduced through the orifice used to fill or top up the casing with oil.

The gage comprises externally a cylindrical gage body 1 made of steel or brass having a length corresponding to the type of casing 2 for which it is adapted, and a diameter of the same order as that of a conventional gage.

This gage body is mechanically and electrically connected to the casing 2 by means of a slotted sheath or resilient sleeve 3 for lateral connection, made of a good heat conducting and somewhat resilient metal such as work-hardened brass, for instance, said sheath having its base upset inwardly to the gage body and its upper portion slightly tapering outwardly by virtue of the spreading tendency of the two symmetrical portions it is made of by virtue of two longitudinal slots (not shown), the thickness of said sheath insuring a packing with minimum clearance in the space between the gage body 1 and the casing 2 and its resiliency creating a suitable contact pressure while allowing the gage to be readily inserted into place and removed.

The amount the gage is allowed to penetrate into the casing is determined and limited by a stop 4, set over the gage body and adapted to rest against the boss 2a of the casing orifice.

In the instances where the filling or top-up opening of the casing also serves the purpose of receiving the gage (Fig. 4), the gage body 1 is set in a ring 5 which itself is set to the cover 6 and to an element forming a spring 7 with good conducting properties which plays for the gage the double role of the sleeve 3 in the general instance above mentioned.

The gage body is set at its lower end to contain a nipple 8 made of good conducting metal with an axial duct comprising two portions one of which 8a constitutes a passage offering a considerable head drop determined by the size of said passage (for instance 1 mm. in diameter and 3 mm. in length) opposing the flow of oil in either direction, said passage being preceded by a wider duct 8b adapted to protect the narrow passage against any obstruction by foreign matters present on the bottom of the casing.

The nipple 8 may have the shape of a body of revolution or, as indicated at 8′ on Fig. 3, it may have its upper end 8′a cut obliquely.

The gage is fitted internally in its lower part with a sheath or contact tube 9 made of a good conducting metal, applied against the body 1 through the medium of a cylindrical insulating layer 10 preferably constituted of crystal paper or optionally of cellulose, or cellophane, or merely of a void, said tube being longitudinally positioned at both its contracted ends by means of two annular abutments 11 and 12 of suitable shape made of insulating material, preferably Bakelite or polystyrene; the upper abutment 11 being shouldered by an annular rib 1a inwardly pressed into the body 1.

The tube 9 comprises, at its upper end portion, a connecting thimble 13 to which it is fitted and in which the braided wire 14 is squeezed inside the gage.

The parts 11 and 13 each have a longitudinal passage 11a and 13a respectively which, together with an opening 15 through the gage body, make the pressure on the level of the oil contained within the gage equal to the pressure in the casing.

The contact tube 9 houses a float 16 having the shape of a cylinder with rounded ends having a diameter nearly equal to that of the tube 9 (namely 4 mm. and 5 mm. respectively), constituted of a very thin copper envelope (thickness of the order of $5/100$ mm.) enclosing a cork rod 16a previously introduced into said envelope under a well determined compression degree and also with rounded ends over which the ends of the envelope are contracted with occasionally a closing cup member inserted therebetween and a thin coating of shellac in order to achieve a perfect sealing of the inside of the float.

The float is so designed that it achieves a geometrical contact relatively wide against the tube 9 as well as against the nipple, the shape or shapes of which are designed accordingly.

The gage body 1 is fitted with a gage top constituting a member for electrical connection to the signalling box 18, and comprising a brass sleeve 19 to which the inner wire 14 is connected as by crushing and, if need be, by soldering and which rests upon the body 1 through an insulating bushing 20, preferably of Bakelite, while being at the same time insulated by a sheath 21 (made of the same material as 20) from a steel sleeve 22 which surrounds the whole assembly and secures it to the gage body 1 as by upsetting, a sleeve 22a being inserted therebetween.

The socket 19 provides for an excellent electric contact adapted to be readily established or broken, by its cooperation with a plug 23 fitted to the free end of the outer conductor 24.

The operation of the gage is very simple:

The earth circuit for the signal lamp 25, which includes the gage, is able to be completed only when the float 16 which, by reason of its flotation conditions is inclined and is permanently contacting the wall of the tube 9, also has its lowermost portion in engagement with the nipple 8; a condition that occurs when the level of the oil in said tube drops to a particular level.

In order to adjust the amount a gage is to penetrate into a casing for which it should be adapted, or in order to check that such amount suits the result aimed at, it is sufficient to check that, when the gage is in place, the level of the oil at which the signal lamp either becomes bright (in the course of an operation for draining the oil) or extinguishes (in the course of a filling operation) corresponds to the level indicated as the critical level by the manufacturer and marked on the conventional gage.

The signal box 18 comprises an opaque closing plate 26 with signalling portions 26a cut out or, preferably, letters indicating an order for immediately drawing the driver's attention.

Preferably this box comprises a device for testing the lamp and its "upstream" circuit, this device being constituted by a push-button 27, connected to ground through the screws 28 for the closing plate and which may be pushed against a grounded strip 29.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense. Thus the two parts 3 and 4 in one case, or the part 5 in the other case, adapted to secure the gage to the casing and to determine the amount it penetrates therein, may be made removable (and not fastened beforehand) for instance by means of a screwing arrangement and possibly united into a single part.

The various modifications may be designed either for a gage adapted for a casing of a vehicle engine or the like, or for other casings, housings or enclosures containing oil or other liquids with a possible critical level to be signalized. Such will be the case, particularly, for the automatic speed boxes using an intermediate liquid medium, and in a broader field for all the devices called torque converters or else for the oil surge reservoirs in hydraulic braking installations.

What I claim is:

1. A gage for indicating the level of oil in an engine crank case having an opening in its wall for admission and retention of a measuring stick, comprising an outer metallic tube of a size to enter said opening, a resilient metallic sleeve surrounding the said tube intermediate its ends and having a normally flaring resiliently compressible portion adapted to fit into said opening and make electrical contact with its wall, an inner metallic tube coaxial with the outer end of the outer tube for a substantial portion of its length and insulated therefrom, a socket member disposed within the outer end of the outer tube and insulated therefrom, an electrical conductor electrically connecting the socket member with the said inner tube, a tubular nipple in the inner terminal end of the outer tube in electrical contact therewith and insulated from the inner tube and a float within the inner tube having an electrically conductive envelope and adapted to effect electrical connection between the nipple and the inner tube.

2. A gage as defined in claim 1 together with a limit stop frictionally and adjustably secured on the outer tube between the resilient sleeve and the outer end of the tube and adapted to bear against the crank case wall.

References Cited in the file of this patent

UNITED STATES PATENTS

| | | |
|---|---|---|
| 1,040,800 | Smith | Oct. 8, 1912 |
| 1,049,952 | Walton | Jan. 7, 1913 |
| 1,227,285 | Maher | May 22, 1917 |
| 1,642,413 | Faunce | Sept. 13, 1927 |
| 2,161,441 | Vickers | June 6, 1939 |
| 2,329,502 | Withrow | Sept. 14, 1943 |
| 2,624,790 | White | Jan. 6, 1953 |
| 2,706,754 | Palladino | Apr. 19, 1955 |